United States Patent
Yu

(10) Patent No.: US 8,612,787 B2
(45) Date of Patent: Dec. 17, 2013

(54) COMPUTER POWER SAVING SYSTEM

(75) Inventor: Song Yu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 265 days.

(21) Appl. No.: 13/095,895

(22) Filed: Apr. 28, 2011

(65) Prior Publication Data
US 2012/0246500 A1    Sep. 27, 2012

(30) Foreign Application Priority Data
Mar. 25, 2011 (CN) .......................... 2011 1 0073009

(51) Int. Cl.
*G06F 1/00* (2006.01)
*G06F 3/00* (2006.01)

(52) U.S. Cl.
USPC .............................. 713/323; 713/340; 710/16

(58) Field of Classification Search
None
See application file for complete search history.

(56) References Cited

U.S. PATENT DOCUMENTS

| | | | |
|---|---|---|---|
| 2006/0035527 A1* | 2/2006 | Numano | 439/668 |
| 2007/0097716 A1* | 5/2007 | Clark et al. | 363/39 |
| 2008/0313477 A1* | 12/2008 | Numano | 713/321 |
| 2011/0119516 A1* | 5/2011 | Katayama et al. | 713/340 |
| 2011/0167283 A1* | 7/2011 | Campesi et al. | 713/310 |

OTHER PUBLICATIONS

Sherman, Len. "The Basics of USB Battery Charging: A Survival Guide", Dec. 9, 2010, Maxim Integrated. http://www.maximintegrated.com/app-notes/index.mvp/id/4803.*

* cited by examiner

*Primary Examiner* — Kim Huynh
*Assistant Examiner* — Vincent Chang
(74) *Attorney, Agent, or Firm* — Altis Law Group, Inc.

(57) ABSTRACT

A computer power saving system includes a computer, an UPS, a power detecting device, and an USB device. The computer includes a USB port and a power management module, and can work in a normal mode or in a STR mode. The UPS is connected to the computer and used for supplying power to the computer upon a condition that a commercial power supply stops supplying power to the computer. The power detecting device detects the state of the commercial power supply and sending out an abnormal power signal when the commercial power supply stops supplying power to the computer. The USB device sends the abnormal power signal to the USB port. When the computer works in the normal mode, the power management module detects the USB port, and controls the computer to shift to the STR mode if the USB port receives the abnormal power signal.

5 Claims, 1 Drawing Sheet

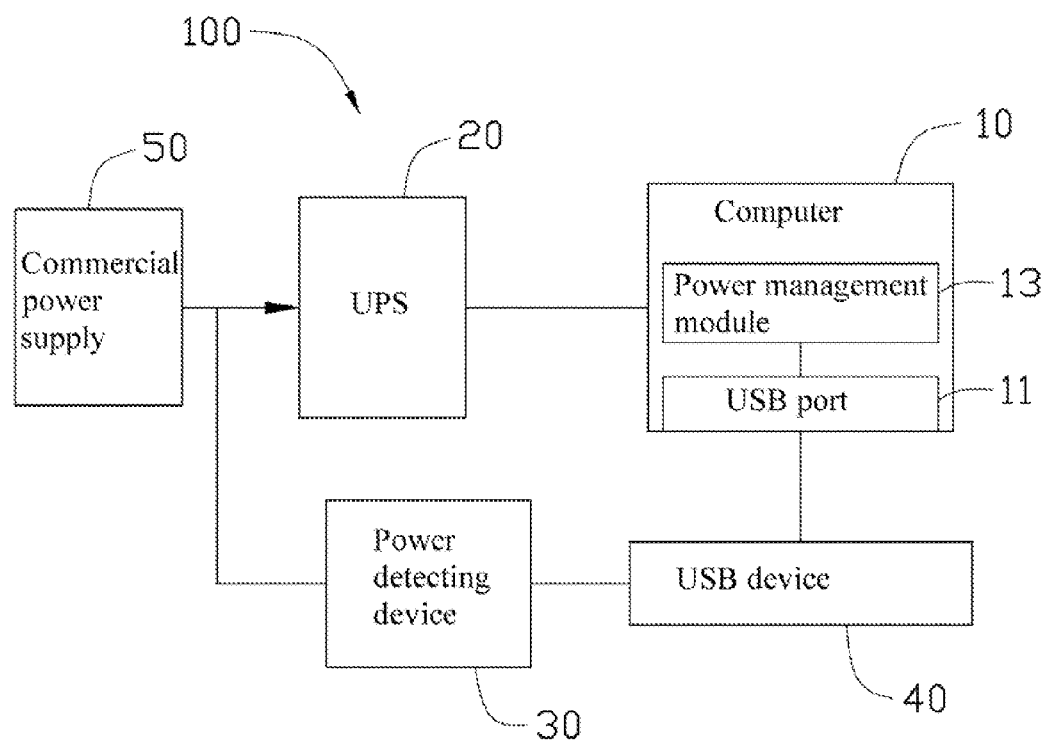

COMPUTER POWER SAVING SYSTEM

BACKGROUND

1. Technical Field

The present disclosure relates to a power saving system, particularly to a computer power saving system.

2. Description of Related Art

For avoiding data loss occurring in a computer when the power supply is suddenly shut down, an uninterruptible power supply (UPS) is usually adopted to alternatively supply power to the computer when the commercial power supply is suddenly shut down. Yet, power stored in the UPS is limited and will exhaust soon if the computer is still working in a normal mode after the commercial power supply has been shut down. If the user is away from the computer when the commercial power supply is shut down, the power of the UPS may soon be exhausted before the user gets back to save the data.

Therefore, it is desirable to provide a computer power saving system, which can overcome the limitations described.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

The FIGURE is a block diagram of a power saving system for a computer according to an embodiment of the present disclosure.

DETAILED DESCRIPTION

Referring to the FIGURE, a power saving system 100 includes a computer 10, an UPS 20, a power detecting device 30, and an universal serial bus device (USB device) 40.

The UPS 20 is connected between the computer 10 and a commercial power supply 50. The commercial power supply 50 supplies power to the computer 10 via the UPS 20. The UPS 20 supplies power to the computer 10 when the commercial power supply 50 is shut down. The computer 10 includes an USB port 11.

The power detecting device 30 is connected to the commercial power supply 50, and is configured for detecting the state of the commercial power supply 50. When the commercial power supply 50 is shut down, the power detecting device 30 sends out an abnormal power signal.

In this embodiment, the power detecting device 30 is a normally closed relay, the relay 30 is connected to the commercial power supply 50 via an AC-DC converter, when the commercial power supply 50 is shut down, the relay 30 opens to send out the abnormal power signal.

The USB device 40 is connected between the power detecting device 30 and the USB port 11 of the computer 10. The USB device 40 is powered by the computer 10 via the USB port 11. When receiving the abnormal power signal from the power detecting device 30, the USB device 40 transforms the abnormal power signal into computer-readable digital form and sends the abnormal power signal to the USB port 11 of the computer 10.

The computer 10 further includes a power management module 13. The power management module 13 can be a program operated in a CPU of the computer 10. When the computer 10 works in a normal mode, the power management module 13 checks whether the USB port 11 receives the abnormal power signal, and controls the computer 10 to enter into suspend to ram (STR) mode when receiving the abnormal power signal. As the STR mode is familiar to a skilled in the art, thus, a detailed description is omitted here.

When working in the normal mode, the computer 10 has a power of about 200 watts. When working in the STR mode, the computer 10 has a power of about 10 watts. In this way, the supply time of the UPS 20 is extremely prolonged.

It will be understood that the above particular embodiments are shown and described by way of illustration only. The principles and the features of the present disclosure may be employed in various and numerous embodiments thereof without departing from the scope of the disclosure. The above-described embodiments illustrate the scope of the disclosure but do not restrict the scope of the disclosure.

What is claimed is:

1. A computer power saving system, comprising:
   a computer comprising a universal serial bus (USB) port and a power management module, the computer being capable of working in a normal mode or in a suspend to ram (STR) mode;
   an uninterruptible power supply (UPS) connected to the computer and configured for supplying power to the computer upon a condition that a commercial power supply stops supplying power to the computer;
   a power detecting device for connecting to the commercial power supply, the power detecting device being configured for detecting the state of the commercial power supply and sending out an abnormal power signal upon a condition that the commercial power supply stops supplying power to the computer;
   an USB device external to the computer and connected between the power detecting device and the USB port, and configured for sending the abnormal power signal to the USB port, the power management module being configured for detecting the USB port when the computer works in the normal mode, the power management module being configured for controlling the computer to shift to the STR mode upon a condition that the USB port receives the abnormal power signal.

2. The computer power saving system of claim 1, wherein the power detecting device is a normally closed relay.

3. The computer power saving system of claim 1, wherein the USB device is powered by the computer via the USB port.

4. The computer power saving system of claim 1, wherein the USB device is configured for transforming the abnormal power signal into computer-readable digital form.

5. The computer power saving system of claim 1, wherein when working in the normal mode, the computer has a power of about 200 watts, and when working in the STR mode, the computer has a power of about 10 watts.

* * * * *